(12) United States Patent
Matsumura

(10) Patent No.: US 11,899,787 B2
(45) Date of Patent: Feb. 13, 2024

(54) INFORMATION PROCESSING SYSTEM, INFERENCE METHOD, ATTACK DETECTION METHOD, INFERENCE EXECUTION PROGRAM AND ATTACK DETECTION PROGRAM

(71) Applicant: HITACHI, LTD., Tokyo (JP)

(72) Inventor: Tadayuki Matsumura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1004 days.

(21) Appl. No.: 16/819,532

(22) Filed: Mar. 16, 2020

(65) Prior Publication Data

US 2020/0380338 A1 Dec. 3, 2020

(30) Foreign Application Priority Data

May 27, 2019 (JP) .................. 2019-098400

(51) Int. Cl.
*G06N 3/047* (2023.01)
*G06F 21/55* (2013.01)
*G06N 5/04* (2023.01)
*G06F 18/214* (2023.01)
*G06F 18/21* (2023.01)
*G06F 18/2413* (2023.01)
(Continued)

(52) U.S. Cl.
CPC .......... *G06F 21/554* (2013.01); *G06F 18/214* (2023.01); *G06F 18/217* (2023.01); *G06F 18/24137* (2023.01); *G06F 21/55* (2013.01); *G06N 3/045* (2023.01); *G06N 3/047* (2023.01); *G06N 5/04* (2013.01); *G06V 10/454* (2022.01); *G06V 10/761* (2022.01); *G06V 10/763* (2022.01); *G06V 10/7796* (2022.01); *G06V 10/82* (2022.01)

(58) Field of Classification Search
CPC ........................................ G06N 3/047
USPC ..................................... 706/15, 45
See application file for complete search history.

(56) References Cited

U.S. PATENT DOCUMENTS

2017/0337449 A1 11/2017 Hamada et al.

FOREIGN PATENT DOCUMENTS

JP 2017-207947 A 11/2017

OTHER PUBLICATIONS

Kilinc, et al., Auto-clustering Output Layer: Automatic Learning of Latent Annotations in Neural Networks, IEEE Transaction on Neural Networks and Learning Systems, 2017, pp. 1-9 (Year: 2017).*

(Continued)

*Primary Examiner* — Wilbert L Starks
(74) *Attorney, Agent, or Firm* — Volpe Koenig

(57) ABSTRACT

To provide a robust information processing system against attacks by Adversarial Example. A neural network model 608, a latent space database 609 for storing position information in a latent space in which first output vectors, which are output vectors of a predetermined hidden layer included in the neural network model, are embedded concerning input data used for learning of the neural network model, and an inference control unit 606 for making an inference using the neural network model and the latent space database are provided. The inference control unit infers the input data based on the positional relationship between the second output vector, which is an output vector of the predetermined hidden layer concerning input data to be inferred, and the first output vectors in said latent space.

15 Claims, 19 Drawing Sheets

(51) Int. Cl.
*G06N 3/045* (2023.01)
*G06V 10/74* (2022.01)
*G06V 10/762* (2022.01)
*G06V 10/778* (2022.01)
*G06V 10/82* (2022.01)
*G06V 10/44* (2022.01)

(56) References Cited

OTHER PUBLICATIONS

Xu, et al., Variational Autoencoder for Semi-Supervised Text Classification, Proceedings of the Thirty-First AAAI Conference on Artificial Intelligence (AAAI-17), 2017, pp. 3358-3364 (Year: 2017).*
Kurakin, et al., Adversarial Examples in the Physical World, Conference Paper at ICLR 2017, 2016, pp. 1-18 (Year: 2017).*
Szegedy C., et al. "Intriguing properties of neural networks" in Proceedings of the 2014 International Conference on Learning Representations (ICLR'14), 10 pgs.
Eykholt K., et al. "Robust Physical-World Attacks on Deep Learning Visual Classification" CVPR 2018, 11 pgs.

* cited by examiner

| LAYER | VALUE | |
|---|---|---|
| Convolution2D | (3, 32, (3,3), ReLu, Conv2D_1) | ~ 6101 |
| MaxPooling2D | (2, 2, MaxPool2D_1) | |
| Convolution2D | (32, 64, (3,3), ReLu, Conv2D_2) | |
| ⋮ | ⋮ | |
| Linear | (256, 10, Softmax, L1) | |

| PARAMETER | VALUE |
|---|---|
| LOSS FUNCTION | Cross Entropy |
| OPTIMIZATION ALGORITHM | SGD |
| LEARNING RATE | 0.001 |
| BATCH SIZE | 32 |
| ⋮ | ⋮ |
| NUMBER OF EPOCHS | 100 |

| IMAGE DATA | LABEL |
|---|---|
| 8 | 8 |
| 4 | 4 |
| ⋮ | ⋮ |
| 6 | 6 |

| DATA STORAGE ALGORITHM | kd TREE |
|---|---|
| STORAGE LAYER | [Conv2D_1, Linear_1] |

| IMAGE UID | LABEL | LAYER NAME | DATA |
|---|---|---|---|
| 0001 | 8 | Conv2D_1 | [0.1, 0.2, 03] |
| 0001 | 8 | Linear_1 | [0.2, 0.2] |
| 0002 | 2 | Conv2D_1 | [0.3, 0.4, 0.5] |
| ⋮ | ⋮ | ⋮ | ⋮ |
| 9999 | 6 | Linear_1 | [0.9, 0.1] |

| LAYER ID USED | Conv2D_1 |
|---|---|
| DISTANCE INDEX | EUCLIDEAN DISTANCE |
| NEAREST NEIGHBOR SEARCH ALGORITHM | kd TREE |

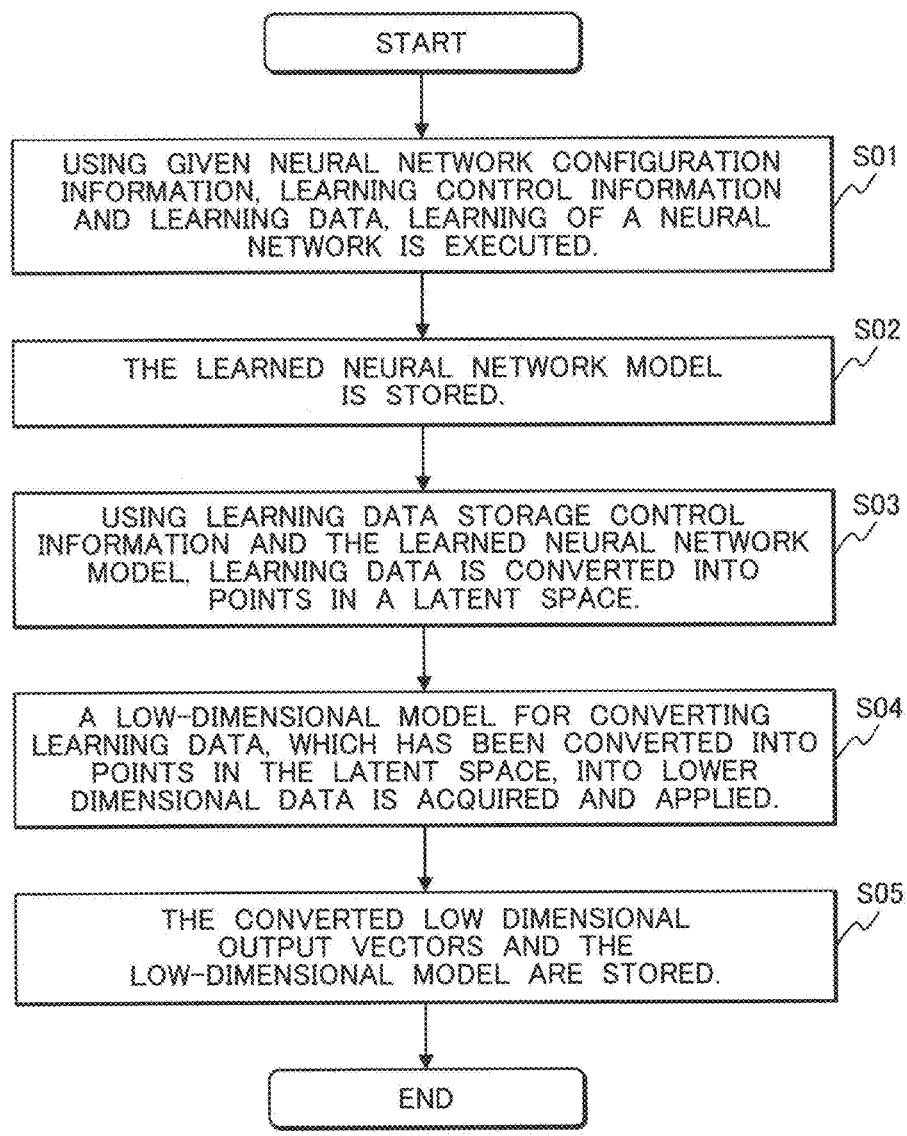

1003

| PARAMETER | VALUE |
|---|---|
| ATTACK DETECTION MODE | MODE 1 |
| ALERT THRESHOLD SIGNAL $k_1$ | 5 |
| ALERT THRESHOLD SIGNAL $k_2$ | 3 |
| ALERT THRESHOLD SIGNAL $k_3$ | 0.9 |

INFORMATION PROCESSING SYSTEM, INFERENCE METHOD, ATTACK DETECTION METHOD, INFERENCE EXECUTION PROGRAM AND ATTACK DETECTION PROGRAM

CROSS-REFERENCE TO RELATED APPLICATION

This application claims priority to Japanese Patent Application No. 2019-098400, filed on May 27, 2019, the entire contents of which are incorporated by reference herein.

FIELD OF THE INVENTION

The present invention relates to information processing systems, inference methods, attack detection methods, inference execution programs, and attack detection programs using neural network models.

DESCRIPTION OF RELATED ART

Due to the progress of sensor technology and communication technology, the M2M (Machine-to-Machine) system that connects various sensors to information systems by communication networks and the IoT (Internet of Things) which is the Internet for things have been considered to be applicable to various industrial fields, such as in the manufacturing industry, agriculture industry, etc., social fields including transportation, energy, etc., and household use, such as health management, security management, etc. For example, remote control services for an apparatus and automatic vehicle driving services are available based on the M2M system and the IoT. Therefore, it is necessary for an enormous amount of sensor data to be acquired and fed back to the controls of the apparatus etc. In order for a control procedure to be quickly and accurately determined based on such an enormous amount of sensor data, it is expected that the use of artificial intelligence be employed.

Recently, specifically in the image recognition field and the reinforcement learning field, it has been proven that machine learning using deep learning can achieve high levels of performance. On the other hand, it has been reported that learned neural network models are not always infallible. For example, non-patent literature 1 indicates that inference made by a neural network model can be incorrectly rendered by inputting noise that is not recognizable to humans onto an input image. Non-patent literature 2 indicates that a traffic-sign camera image that includes minute noise can cheat a neural network in an arbitrary manner. For example, it is disclosed that when a sticker is affixed to part of a traffic stop sign, humans can still recognize the sign as a stop sign, but the neural network incorrectly recognizes the sign as a 45-mph speed-limit sign.

CITATION LIST

Patent Literature

Patent literature 1: JP 2017-207947 A

Non-Patent Literature

Non-patent literature 1: Szegedy C, et al. "Intriguing properties of neural networks" in Proceedings of the 2014 International Conference on Learning Representations (ICLR'14)

Non-patent literature 2: Eykholt K, et al. "Robust Physical-World Attacks on Deep Learning Visual Classification" CVPR 2018

SUMMARY OF THE INVENTION

Problems to be Solved by the Invention

As indicated in non-patent literature 1 and non-patent literature 2, if noise that cannot be recognized by human eyesight is included in an image by a malicious attacker to induce incorrect recognition by a neural network (this is referred to as an "attack by Adversarial Example"), inference systems using a neural network will malfunction. To avoid this, robust information processing systems against attacks by Adversarial Example are required.

Patent literature 1 discloses an elemental technology that has commonality with the present invention. Patent literature 1 discloses a method of determining a degree of similarity with a target object by using a convolutional neural network (CNN). For example, because the final output value from CNN weights a feature quantity to classify a target object into a category, it is difficult to determine the degree of similarity in a way that does not make much of a category of the target object. On the other hand, by using output values of the intermediate layer in which impact of the feature quantity appropriate for classification of category of the target object is relatively low and the impact of other feature quantities of the target object is relatively high, it becomes possible to determine the degree of similarity in a way that does not make much of the category of the target object. The use of the output from the intermediate layer is in common between the present invention and patent literature 1. However, a learned CNN is used for similarity judgment within the range in which original inference has been expanded in patent literature 1. Therefore, patent literature 1 does not make a suggestion concerning the problems disclosed in this patent application.

Means for Solving the Problems

An information processing system, which is an embodiment of the present invention, comprises a neural network model including a plurality of hidden layers; a latent space database for storing position information in a latent space in which first output vectors, which are output vectors of a predetermined hidden layer included in the neural network model, are embedded concerning input data used for learning of the neural network model; and an inference control unit for making an inference using the neural network model and the latent space database. The inference control unit infers the input data based on the positional relationship between the second output vector, which is an output vector of the predetermined hidden layer concerning input data to be inferred, and the first output vectors in the latent space.

Advantages of the Invention

The present invention provides a robust information processing system against attacks by Adversarial Example.

Other problems and new characteristics will be clearly shown by the description of this specification document and the accompanying drawings.

BRIEF DESCRIPTION OF DRAWINGS

FIG. 6B shows an example of neural network configuration information 610.

FIG. 6C shows an example of learning control information 611.

FIG. 6D shows an example of learning data 612.

FIG. 6E shows an example of learning data storage control information 613.

FIG. 6F shows an example of data stored in the latent space database 609.

FIG. 6G shows an example of inference control information 614.

FIG. 7 shows a flowchart of processes executed by the learning unit 601.

DETAILED DESCRIPTION OF THE PREFERRED EMBODIMENTS

Figure 1:
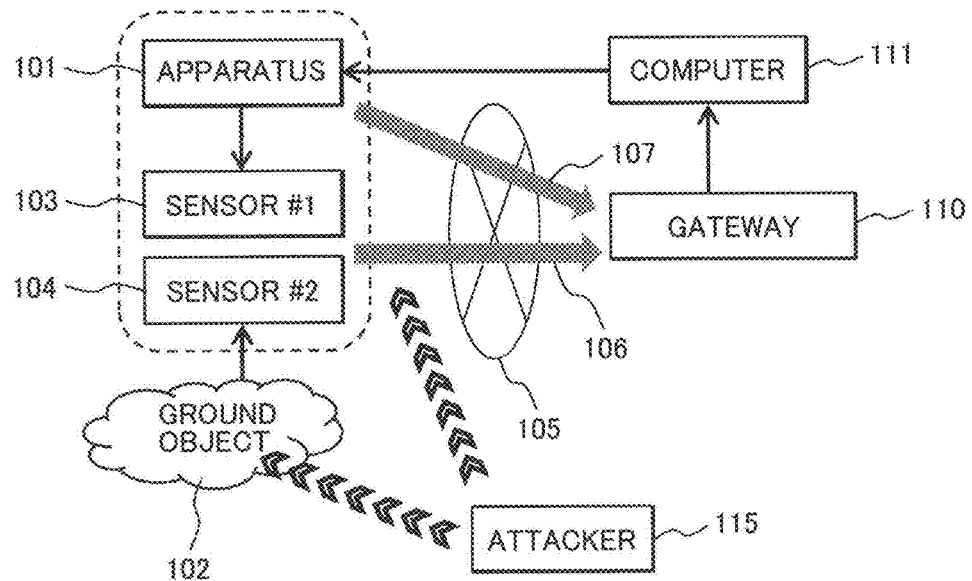
FIG. 1 shows the outline of configuration of the M2M system.

With reference to FIG. 1, configuration of the M2M (Machine-to-Machine) system is outlined. By use of sensors, the M2M system, illustrated in FIG. 1, monitors the controlled apparatus 101 and/or ground objects 102 that constitute an environment of the apparatus 101, thereby controlling the apparatus 101. There are provided a first sensor 103 for monitoring the apparatus 101 and a second sensor 104 for monitoring external ground objects 102, and sensor data 106 from the sensors 103 and 104 is collected by a gateway 110 via a network 105. Status data 107 from the apparatus 101 is also collected by the gateway 110 via the network 105. Sensor data 106 and status data 107 collected by the gateway 110 is sent to a computer 111. The computer 111 generates control data for the apparatus 101 by use of artificial intelligence and sends the control data to the apparatus 101.

In the M2M system shown in FIG. 1, communication methods among the sensors, gateway, computer, and apparatus are not particularly limited. Communication between the gateway 110 and the computer 111 or between the computer 111 and the apparatus 101 may be performed via a network, or by direct one-to-one connections. Since an object to be sensed by a sensor depends on a system application, the system can be configured using either a first sensor 103 or a second sensor 104 only.

For example, the M2M system may be a remote control system. The first sensor 103 is a monitoring camera, and the computer 111 controls the apparatus 101 which is a control target based on the surveillance images taken by the monitoring camera 103. Also, the M2M system may be an automatic driving system. For example, the first sensor 103 is an in-vehicle sensor for sensing the vehicle's travelling conditions and detects the vehicle's speed, acceleration, steering angle, etc. The second sensor 104 can be a sensor for detecting lanes or a camera installed in a vehicle or on the roadside to detect people and obstacles. The computer 111 integrates such information and controls a vehicle 101 which is a control target.

Figure 2:
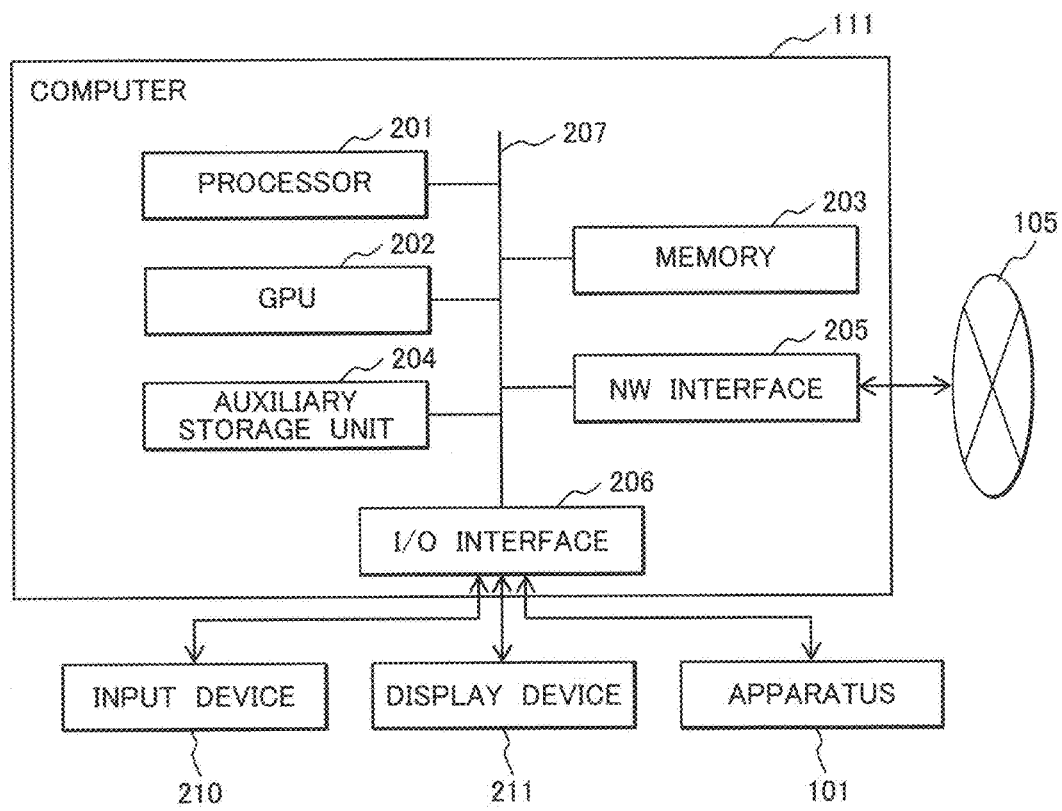
FIG. 2 shows an example of hardware configuration of the computer.

FIG. 2 shows an example of hardware configuration of the computer 111. The computer 111 includes a processor 201, a GPU (Graphics Processing Unit) 202, a memory 203, an auxiliary storage unit 204, a network interface 205, and an input/output interface 206; and those units are connected by buses 207. The input/output interface 206 is connected to an input device 210, such as a keyboard, operation buttons etc., and a display device 211, thereby realizing a GUI (Graphical User Interface). Moreover, the input/output interface 206 may be connected to the controlled apparatus 101. The network interface 205 is to be connected to a network 105. The drawing shows an example in which the computer 111 is connected to the controlled apparatus 101 via the input/output interface 206; however, the computer 111 may be connected to the controlled apparatus 101 via a network 105.

An auxiliary storage unit 204 is usually a non-volatile memory, such as an HDD (Hard Disk Drive), ROM (Read Only Memory), and flash memory, and stores programs executed by the computer 111 and data to be processed by the programs. A memory 203 is a RAM (Random Access Memory) and temporarily stores programs and data necessary for executing the programs, according to an instruction by the processor 201. The processor 201 executes programs loaded onto the memory 203 from the auxiliary storage unit 204. The computer 111 is supposed to make an inference using a neural network model. When the computer 111 executes learning of the neural network model, repeat operation must be executed a plurality of times by nature. Therefore, it is desirable that a GPU 202 should be provided in addition to the processor 201 which is the CPU (Central Processing Unit).

In the following example, programs stored in the auxiliary storage unit 204 are executed by the processor 201 and predetermined processes are executed in cooperation with other hardware; and thus, calculation and control functions can be executed.

The computer 111 is not limited to a PC (Personal Computer) or a server, but it may be a tablet or a mobile device. The computer 111 may be a device incorporated into the apparatus 101. Alternatively, services executed by the computer 111 may be implemented on the cloud.

Example 1

Figure 3:
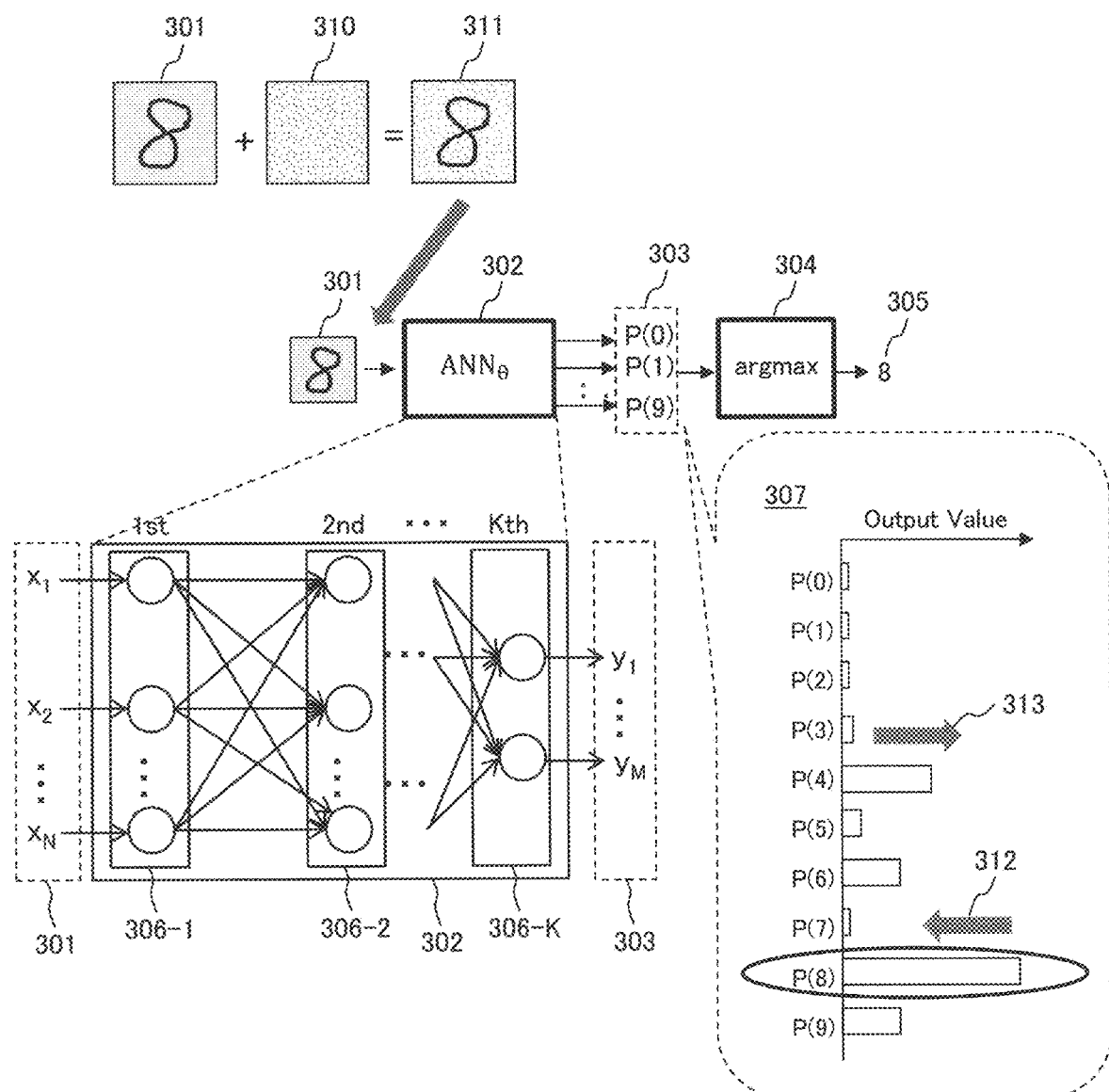
FIG. 3 is a diagram that explains a security problem of the inference using a neural network model.

In example 1, the computer 111 makes an inference using a learned neural network model. With reference to FIG. 3, inference using a conventional neural network model will be explained. FIG. 3 shows an example in which a number written on an image 301 is inferred; specifically, which label (herein, any one of numbers from "0" to "9") is applicable to the image 301 is inferred. When the image 301 is input, the learned neural network model 302 outputs probabilities 303 that the image 301 corresponds to respective labels. Based on the probabilities 303, the determination unit 304 determines the label 305 applicable to the image 301.

The image 301 is input into the neural network model 302 as pixel value vectors. For example, if the image 301 is a 28-by-28-pixel image, the image 301 is input into the neural network model 302 as input vector X ($x_1, x_2 \ldots x_N$) (N=784) having a pixel value of each pixel. The neural network model 302 includes, for example, K-layer hidden layers 306. The input vector X is input into the first hidden layer 306-1; and output vector Y ($y_1, y_2 \ldots y_M$) (M=10) of the final hidden layer 306-K indicates probabilities that the image 301 corresponds to respective labels from "0" to "9". The determination unit 304 determines the label that corresponds to the image 301. For example, when the probabilities that the image 301 corresponds to respective labels are output from the neural network model 302 and the probabilities are the values indicated in the graph 307, the label "8" having the maximum probability P is determined to be the label 305 applicable to the image 301.

Figure 4:
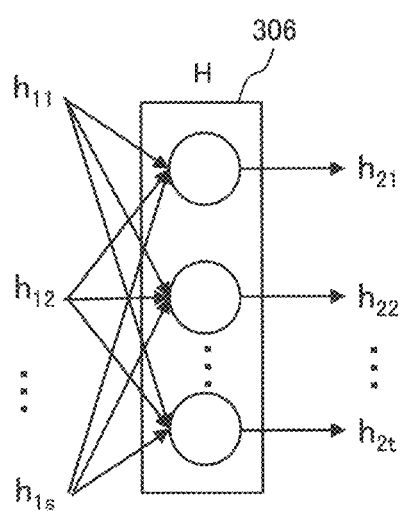
FIG. 4 is a diagram that explains a hidden layer of a neural network model.

With reference to FIG. 4, hidden layers 306 included in the neural network model 302 will be explained. The hidden layer 306 can be expressed as linear mapping H that converts input vector $h_1$ ($h_{11}, h_{12} \ldots h_{1s}$) into output vector $h_2$ ($h_{21}, h_{22} \ldots h_{2t}$). In the neural network model 302, input/output vectors conveyed between the hidden layers 306 are also referred to as "latent vectors". Herein, in the learned neural network model 302, the degree of a latent vector which is an output vector of hidden layer H is considered to be lower than the degree of a latent vector which is an input vector of the hidden layer H (s>t). This is because in a learned model, an intrinsically important dimension to express the image 301 has been extracted by the operation of the hidden layer H.

There is a possibility that an attack by Adversarial Example could be attempted against inference using such a neural network model. As shown in FIG. 3, an attack by Adversarial Example is executed such that an attack image 311 superposed with a predetermined noise image 310 is input into the neural network model 302 instead of a correct image 301 in order to cause incorrect inference. Due to the effect of the noise image 310 superposed with the attack image 311, it is possible to alter probabilities 303 output from the neural network model 302 in such a manner that the probability corresponding to label "8" is lowered (arrow 312) or the probability corresponding to another label (e.g., label "3") is increased (arrow 313) as shown in graph 307. In this example, an inference method that uses a neural network model and is robust against such an attack by Adversarial Example will be proposed.

Moreover, a method of creating an attack image 311 by an attacker 115 is not particularly limited. As shown in FIG. 3, an attack image 311 may be created by superposing a noise image 310 with the image 301. Alternatively, there is a possible method by which a photographed target (e.g., ground object) itself is processed similarly to a noise image 310 and photographed by a camera, and that attack image 311 is input into the neural network model 302 instead of the originally-intended image 301 (see FIG. 1).

Figure 5A:
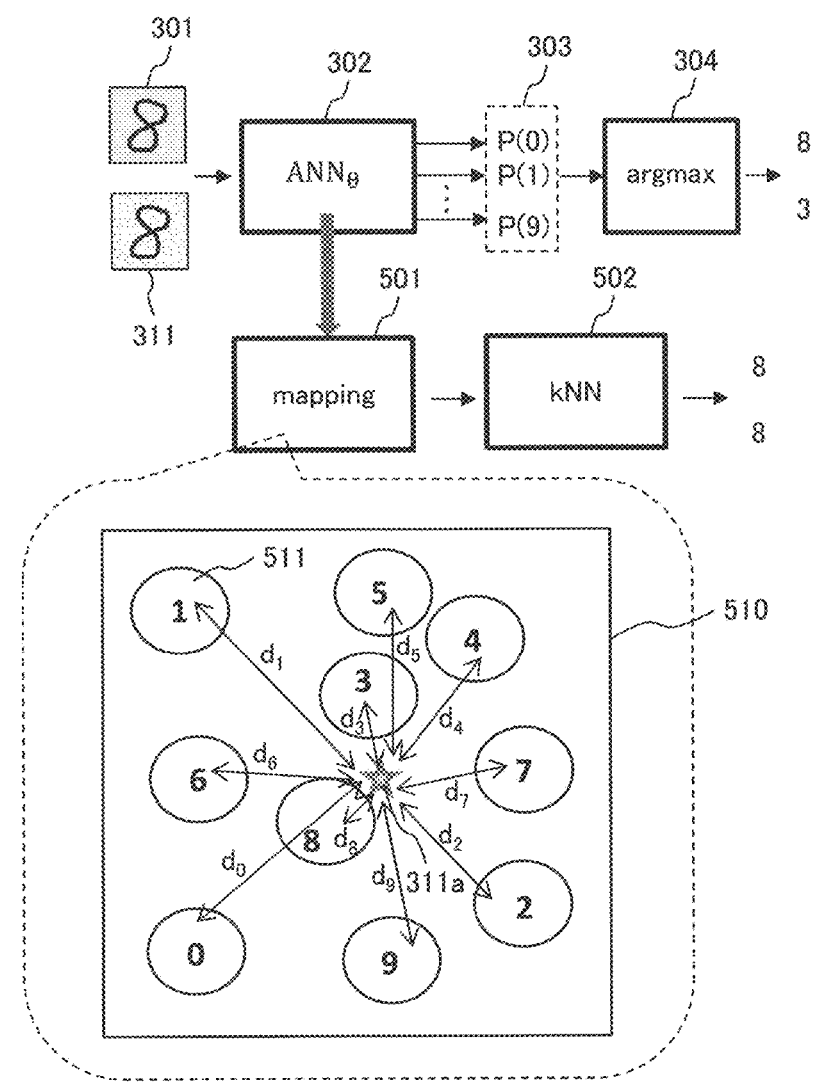
FIG. 5A is a diagram that explains the inference using a neural network model of this example.

With reference to FIG. 5A, an inference method using a neural network model of this example will be explained in comparison with the inference method (hereafter, referred to as a "conventional method") that uses the neural network model shown in FIG. 3. In the conventional method, inference is made by a route via a neural network model 302 and the determination unit 304. In this example, inference is made by a route via the neural network model 302, the mapping unit 501, and the distance base determination unit 502.

Reasons that the conventional method is vulnerable to attacks by Adversarial Example are considered as described below.
(1) Inference is overly dependent on current input data only (e.g. input image). In the conventional method, weighting (coefficient of linear mapping H) of the neural network model is adjusted using a large amount of learning data during the learning step; however, learning data is never used during the inference step.
(2) Inference is made using only the final output from the neural network model. Therefore, in the conventional method, if noise existed in the image is within the amount of noise included in learning data, correct inference is expected. However, if the noise has been intentionally created by a malicious attacker, even a small amount of noise could significantly affect probability values output by the neural network model.

In light of the above, in the inference method of this example, the label of input data is to be inferred based on the distance between input data and learning data in a latent space in which output vectors are embedded, in the intermediate hidden layer of the learned neural network model 302.

Figure 5B:
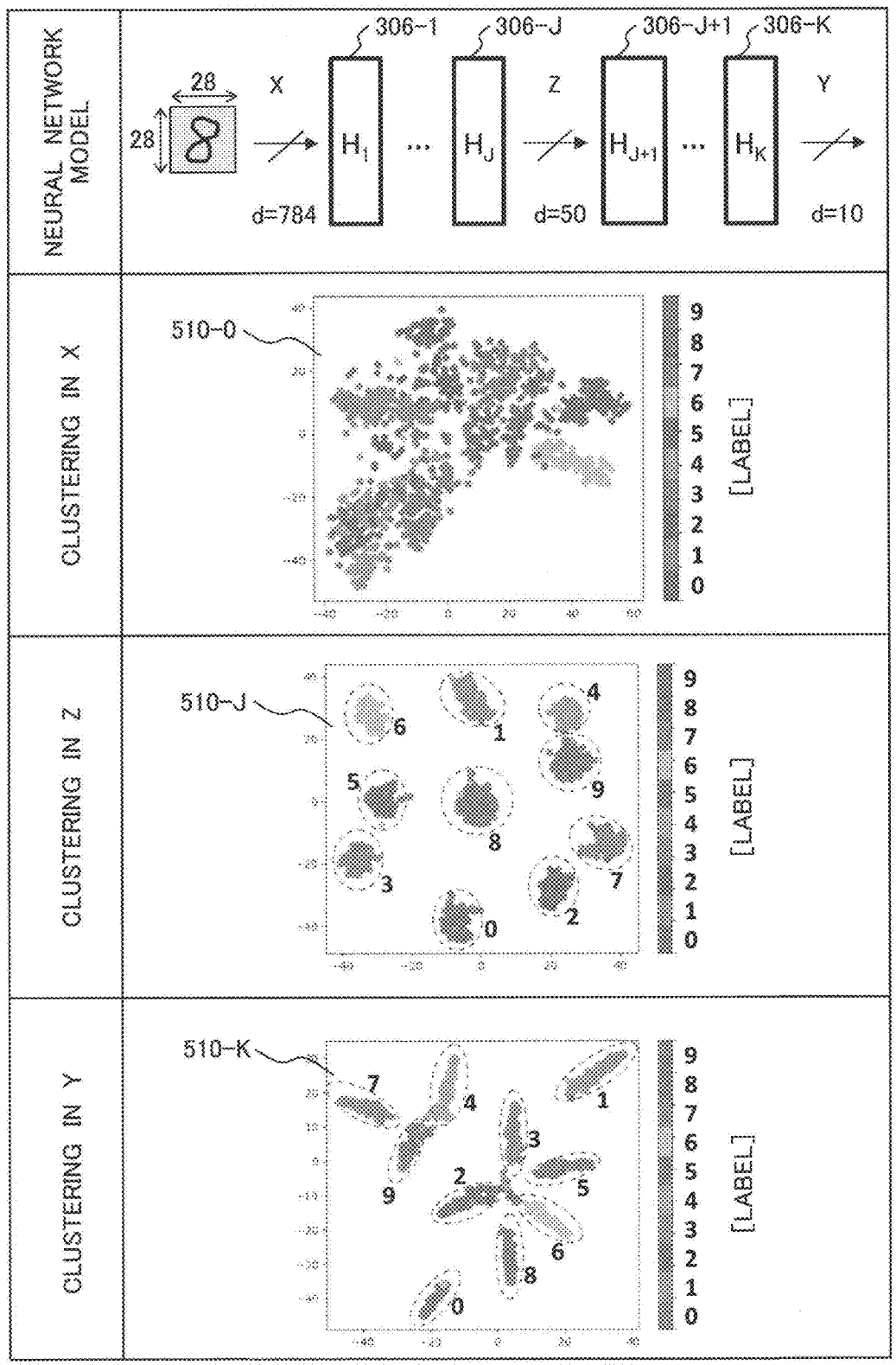
FIG. 5B is an example in which input/output vectors corresponding to learning data are mapped in a latent space.

FIG. 5B shows an example in which input/output vectors corresponding to learning data are mapped in a latent space 510 in a hidden layer 306 of the learned neural network model. Generally, the latent space is a high dimension, and it is difficult to illustrate it. Therefore, FIG. 5B shows an example in which the latent space is re-mapped as a two-dimensional space to be visualized. As shown at the top stage of FIG. 5B, the learned neural network model is supposed to include K-layer hidden layers 306. In the latent space 510-0, input vectors X that are input into the first hidden layer 306-1 are mapped. The input data (image data) is a 28-by-28-pixel image, and the input vector X is a 784-dimensional (d=784) vector. One dot corresponds to one piece of learning data. In the latent space 510-0, input vectors X are not clustered in respective labels.

In the latent space 510-J, output vectors Z output from the J-th hidden layer 306-J which is an intermediate layer are mapped. Through the process executed in the J-th hidden layer, output vectors Z are mapped in the lower 50-dimensional (d=50) latent space. In the latent space 510-J, it is indicated that output vectors Z begin to be clustered in respective labels. Clusters of respective labels in the latent space 510-J are encircled by a broken line with a corresponding label attached.

In the latent space 510-K, output vectors Y output from the K-th hidden layer 306-K which is the final layer are mapped. Through the process executed in the K-th hidden layer, output vectors Y are mapped in the further lower 10-dimensional (d=10) latent space. Similar to the latent space 510-J, clusters of respective labels in the latent space 510-K are encircled by a broken line with a corresponding label attached.

In such a latent space 510, even if the image is an attack image 311 intentionally created to cause incorrect recognition of the image with "8" as an image with "3", output vectors are likely to be mapped in the "8" cluster. This is because the output vector value of the attack image 311 in the latent space 510 is likely to be closer to the output vector value of the original image 301 even if probability of label "3" in the output 303 from the neural network model can be changed to a larger value than the probabilities of other values including the correct label "8" on the attack image 311.

Therefore, in the inference method of this example, as shown in FIG. 5A, output vectors, corresponding to input data, of the predetermined intermediate hidden layer in the learned neural network model are mapped in a latent space by the mapping unit 501, and based on the positional relationship with the output vectors corresponding to learning data in the latent space, an inference is made. As schematically shown in FIG. 5A, output vector clusters 511 of respective labels are present in the latent space 510. In the drawing, labels corresponding to respective clusters are shown. Furthermore, output vectors corresponding to input data 311 are mapped at position 311a. The distance base determination unit 502 calculates distances $d_0$ to $d_9$ between the position 311a and the clusters 511 of respective labels, and based on the distances, the label of the input data is inferred. Thus, it is possible to make a robust inference against attacks by Adversarial Example.

Figure 6A:
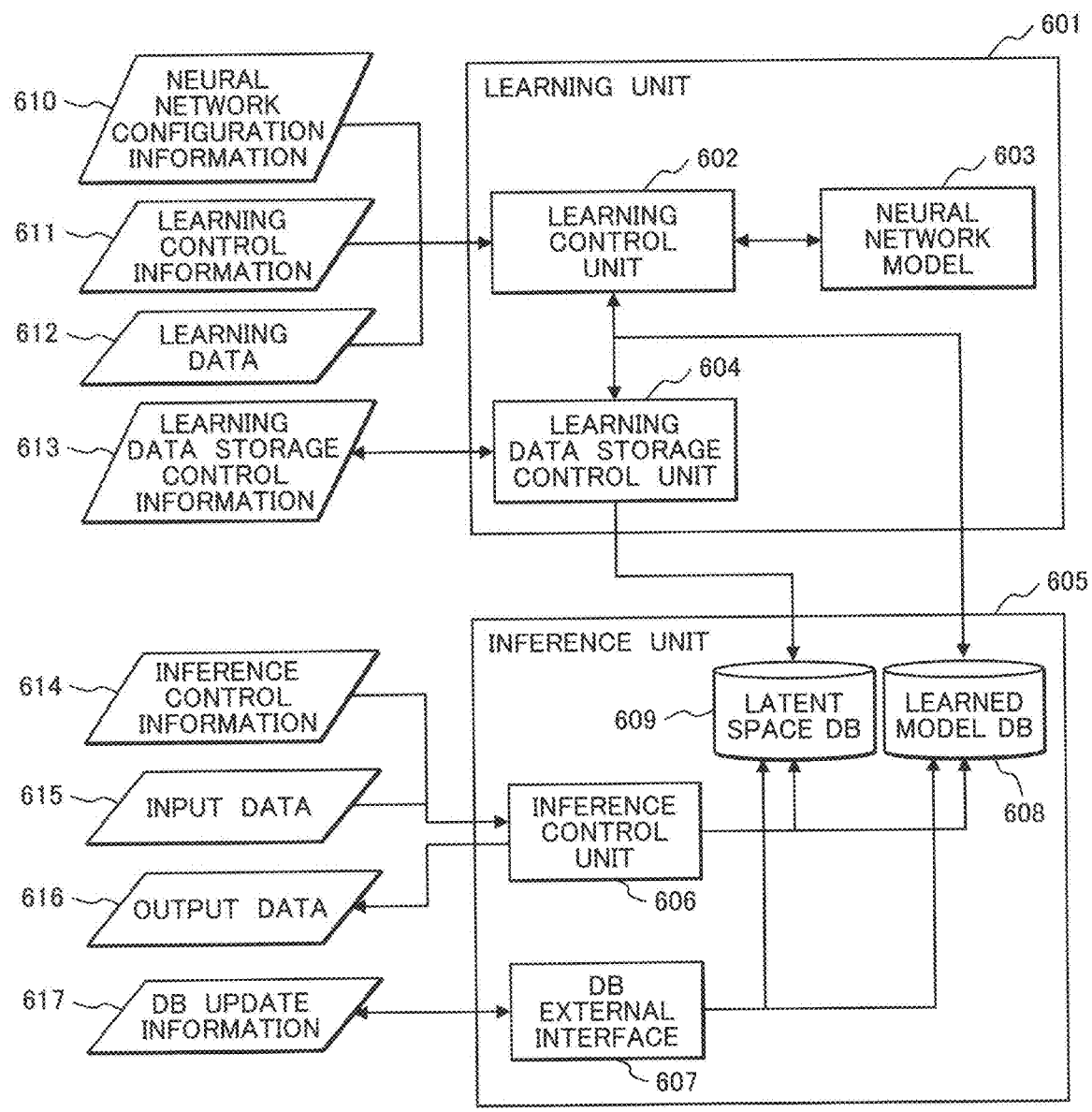
FIG. 6A is a functional block diagram showing the neural network system.

FIG. 6A is a functional block diagram showing the neural network system implemented on the computer 111 according to example 1. The neural network system roughly comprises a learning unit 601 and an inference unit 605. The learning unit 601 executes learning of the neural network model using learning data, which means adjustment of weighting (coefficient of linear mapping H) of the neural network model, and stores the learning data mapping position in a predetermined latent space. The inference unit 605 makes an inference using the neural network model learned in the learning unit 601. The inference method according to the example shown in FIG. 5A is applied to this inference method.

First, the learning unit 601 will be explained. FIG. 7 shows a flowchart of processes executed by the learning unit 601. The learning control unit 602 executes learning of the neural network model 603 using input neural network configuration information 610, learning control information 611, and learning data 612 (S01). FIG. 6B shows an example of neural network configuration information 610. The neural network configuration information 610 defines respective hidden layers constituting the neural network model 603. Parameters of respective hidden layers are also defined. For example, in the convolution layer 6101, the number of input channels, the number of output channels, filter size (x, y), activation function, and unique ID are defined as parameters. An example of learning control information 611 is shown in FIG. 6C. The learning control information 611 defines a learning method for the neural network model 603. An example of learning data 612 is shown in FIG. 6D. Learning data 612 is a combination of an exercise (e.g. image data with a number written on it) and training data indicating a label which is the exercise's answer (e.g. a number written on the image data). Herein, publicly-known machine learning can be applied to the learning by the learning control unit 602, and the learning method is not limited to a specific neural network model. After learning has been completed, the learning control unit 602 stores the learned neural network model in the learned model database 608 (S02).

Successively, the learning data storage control unit 604 calculates output vectors of the predetermined hidden layer corresponding to learning data using learning data storage control information 613 and the learned neural network model (S03). Each output vector is positioned at one point in the predetermined latent space. FIG. 6E shows an example of learning data storage control information 613. In this example, output vectors of two hidden layers (Conv2D_1 layer, Linear_1 layer) are stored, and the kd tree algorithm is applied as a data storage algorithm at that time. To avoid complication of explanation, FIG. 5A indicates that the distance base determination unit 502 calculates distances $d_0$ to $d_9$ between the position 311a and the clusters 511 of respective labels; however, the distance to one point in each cluster is not calculated, but the distance to the learning data mapping positions is actually calculated in order to determine to which cluster the distance is the shortest. Because calculating distances to all of the enormous amount of learning data causes calculation load to become extremely heavy, it is preferable that calculation load should be reduced by deleting publicly-known data applied to the nearest neighbor search algorithm or using structuring technology. The data storage algorithm for learning data storage control information 613 defines the calculation method that can reduce calculation load. When the kd tree algorithm is applied as a data storage algorithm, hierarchization of data according to distance is executed to store the data. Besides, when an error deletion kNN (k-Nearest Neighbor) algorithm is applied, incorrect classification data is deleted; and when a compressive kNN algorithm is applied, it is possible to reduce calculation load by deleting data near the cluster center of each label.

Furthermore, it is well known that if calculated output vectors are high dimensional, which means that the latent space is high dimensional, a situation arises in which concept of distance between two points (both of them are output vectors) in the latent space becomes meaningless. Therefore, when dimension of the latent space is high, it is preferable that the calculated output vectors should not be directly used but converted into lower dimensional data. For this reason, the PCA (Principal Component Analysis) or manifold learning (t-SNE (t-distributed Stochastic Neighbor Embedding), MDS (multi-dimensional scaling)) is applied in order to obtain a low-dimensional model that can convert output vectors into lower dimensional data, and the obtained model should be used to convert the output vectors into lower dimensional data (S04).

The learning data storage control unit 604 applies the low-dimensional model to output vectors of the predetermined hidden layer obtained for each learning data and stores the converted low dimensional output vectors in the latent space database 609 along with the low-dimensional model (S05).

Figure 8:
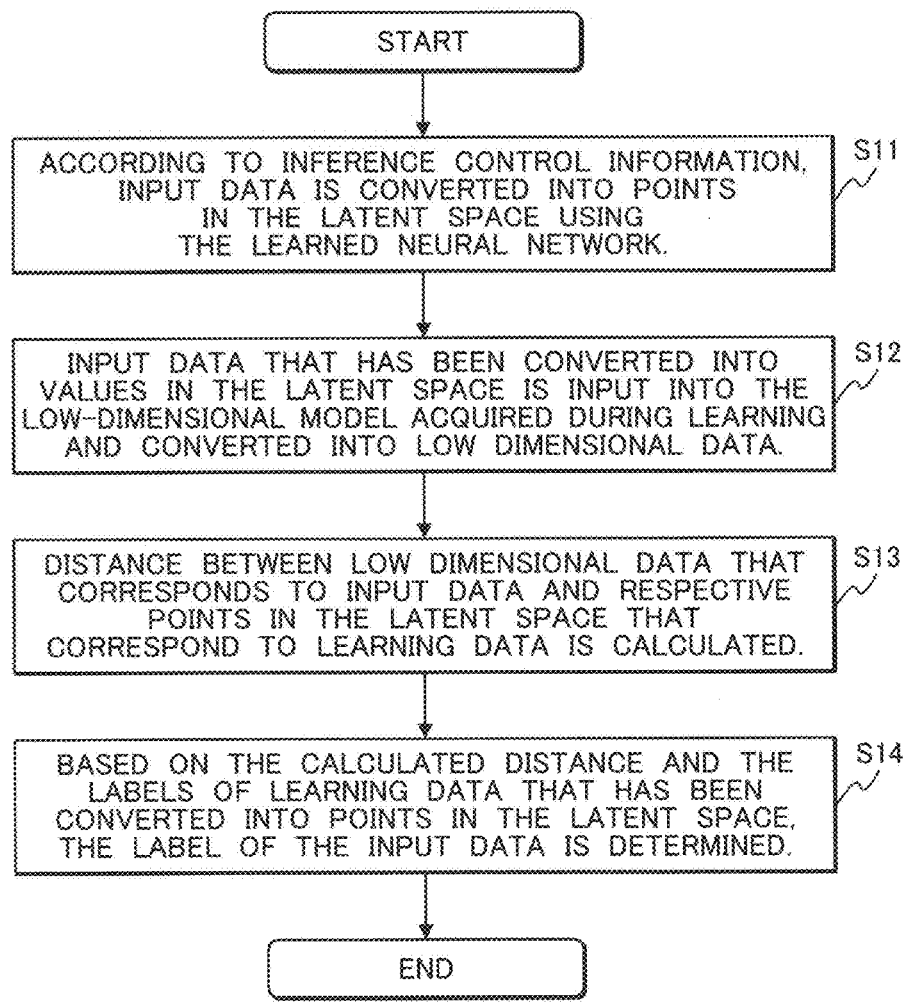
FIG. 8 shows a flowchart of processes executed by the inference unit 605.

Next, the inference unit 605 will be explained. FIG. 8 shows a flowchart of processes executed by the inference unit 605. The inference control unit 606 first applies a learned neural network model stored in the learned model database 608 to input data 615 and then obtains output vectors of the predetermined hidden layer corresponding to input data 615 (S11). An output vector is positioned at one point in the predetermined latent space. Then, the input data that has been converted into values (output vectors) in the latent space is input into the low-dimensional model stored in the latent space database 609 and converted into low dimensional data (S12). Successively, distance between the low dimensional data corresponding to input data and the respective points in the latent space corresponding to learning data is calculated (S13). After that, based on the calculated distances and the learning data labels that have been converted into respective points in the latent space, the label of the input data is determined (S14). For example, an output vector cluster of the learning data which is the nearest neighbor of the output vectors of the input data 615 in a latent space is extracted, and the cluster's label is inferred as a label of the input data 615 and output as output data 616.

FIG. 6F shows an example of data stored in the latent space database 609. Concerning the hidden layer defined as a "storage layer" in learning data storage control information 613, output vectors of the learning data (already converted into low dimensional data) are stored ("Data" column). In this example, data on a plurality of layers is managed in one table; however, data on each layer may be managed in each table. FIG. 6G shows an example of inference control information 614. The inference control information 614 defines an algorithm for calculating distance in each latent space and extracting the nearest neighbor cluster of the label's output vectors in order to apply the algorithm to reduce calculation load. In this example, search in a latent space in which output vectors of the hidden layer Conv2D_1 are mapped is defined as searching the nearest neighbor cluster by using a Euclidean distance as a distance index and applying the kd tree algorithm. For example, it is also possible to use Mahalanobis' distance as a distance index, and locally sensitive hash can also be used as a nearest neighbor search algorithm.

FIG. 6A shows a neural network system equipped with a learning unit 601 and an inference unit 605. However, if arithmetic capacity of the computer 111 is not high, only the inference unit 605 is implemented and the learning unit 601 may be implemented on a computer with high arithmetic capacity. In such a case, or even if the learning unit 601 is also provided, it is desirable that the inference unit 605 should be able to externally update the learned model database 608 and the latent space database 609 so that an external computer with high arithmetic capacity can execute learning or update learning and reflect the result in the database of the inference unit 605 or can add new neural network models and output vectors of learning data. In this case, the inference unit 605 is provided with a database external interface 607, and when receiving database update information 617 from an external source of the learned neural network model, the inference unit 605 can update or add data to the learned model database 608 and latent space database 609 via the interface 607.

An example was shown above in which a low-dimensional model was acquired for converting output vectors into lower dimensional data at the learning step performed by the learning unit 601. However, a low-dimensional model for converting output vectors, including output vectors corresponding to input data, into low dimensional data at the inference step performed by the inference unit 605 may be acquired. The process flow in this case will be explained as a modification. The learning process flow in this case is similar to the flowchart shown in FIG. 7, but step S04 is removed, and output vectors corresponding to the learning data obtained in step S03 are directly stored in the latent space database 609 in step S05.

Figure 9:
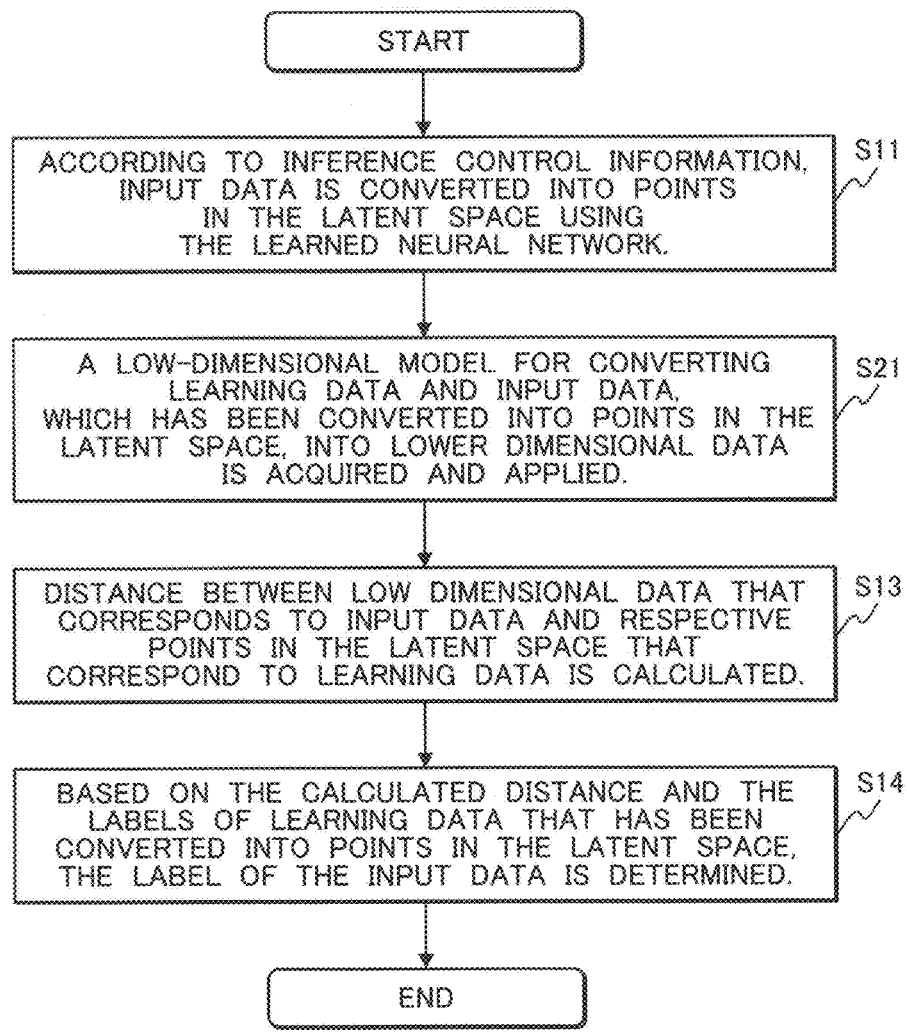
FIG. 9 shows a flowchart of processes executed by the inference unit 605.

The inference process flow in this case is shown in FIG. 9. Instead of step S12 in FIG. 8, in the process flow in FIG. 9, step S21 is performed in which a low-dimensional model for converting learning data and input data, which have been converted into points (output vectors) in a latent space, into lower dimensional data is acquired and applied. The low-dimensional model can be acquired in the same manner as in step S04 of the flowchart shown in FIG. 7. Steps other than step S21 are the same as those in the flowchart shown in FIG. 8.

Example 2

In example 2, in addition to the inference function, the inference unit has a function to detect an attack by Adversarial Example. Therefore, in example 2, inference made by a neural network model and inference based on the positional relationship in a latent space of the intermediate hidden layer are executed in parallel, inference results are compared and occurrence/non-occurrence of an attack is detected based on the comparison results; and if an occurrence of an attack is determined, an attack alert notification is sent to the user. Since an attack by Adversarial Example is performed sneakingly, the attack is characterized in that conclusion made by the determination unit 304 (see FIG. 3) is intentionally made wrong while overall impact is kept as small as possible. That is, although the attack image 311 in a latent space is located at the original position (position of the image data 301 in the latent space before the noise image 310 is superposed), an abnormal value is to be output from the determination unit 304. In example 2, an attack by Adversarial Example is detected by using such a feature.

Figure 10:
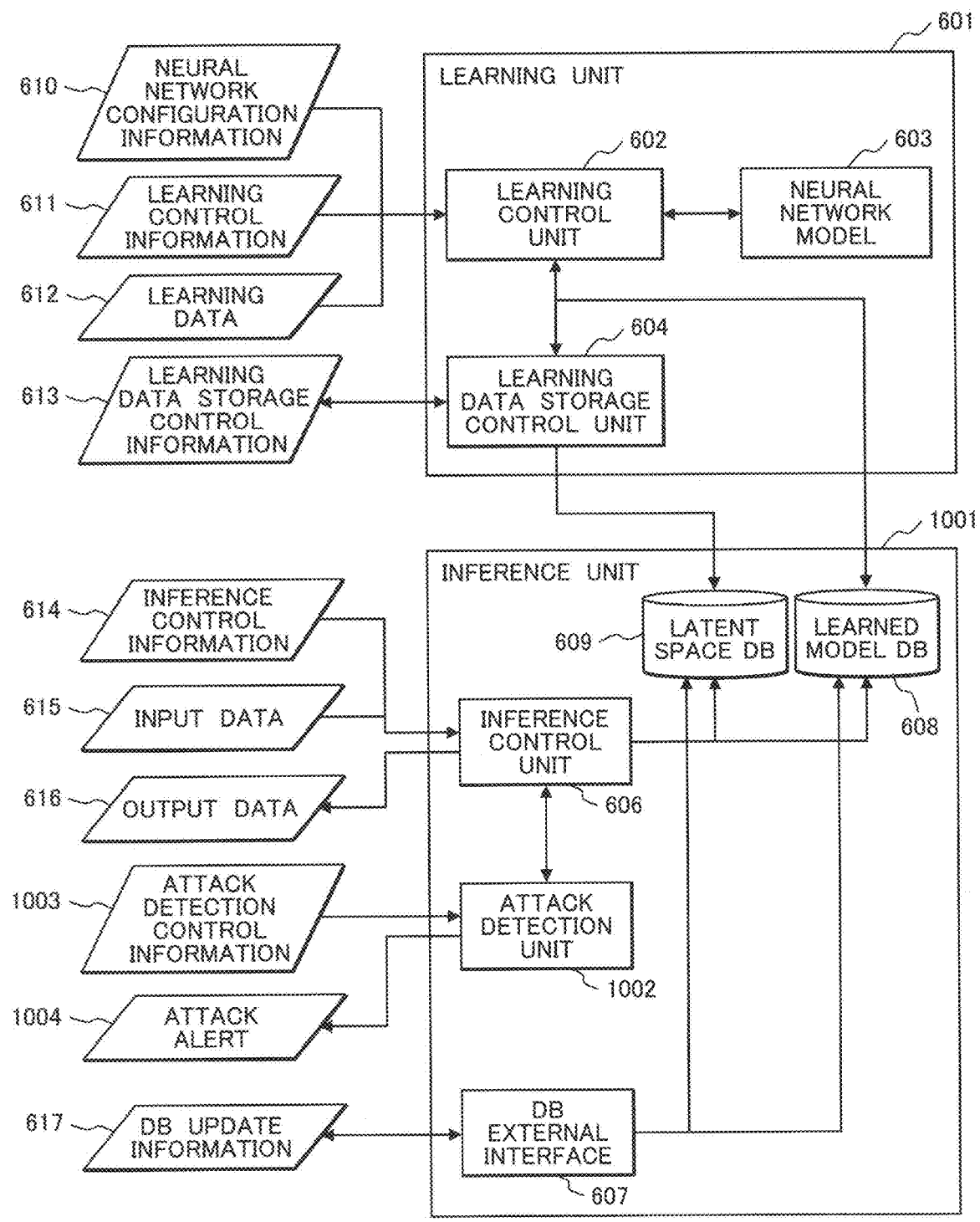
FIG. 10 is a functional block diagram showing the neural network system.

FIG. 10 is a functional block diagram showing a neural network system implemented on a computer 111 according to example 2. The same reference sign is provided for the same function block having the same function as the block in example 1, and detailed explanation will be omitted. The inference unit 1001 is equipped with an attack detection unit 1002 for detecting an attack by Adversarial Example.

Figures 11, 12:
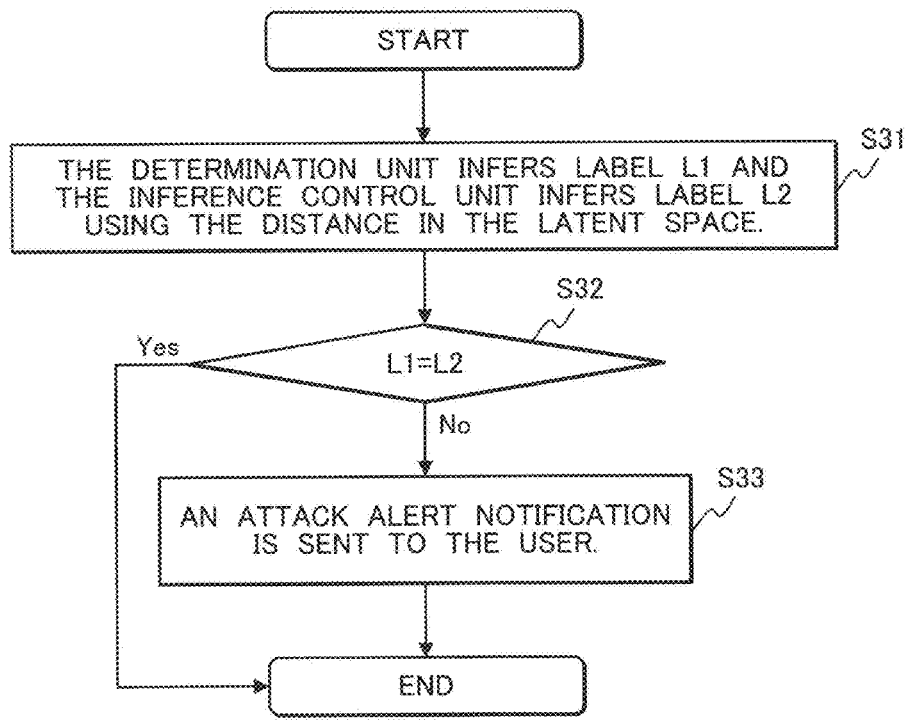
FIG. 11 shows an example of attack detection control information 1003.
FIG. 12 shows an attack detection flow in attack detection mode 1.

An example of attack detection control information 1003 input into the attack detection unit 1002 is shown in FIG. 11. The attack detection unit 1002 can use a plurality of detection methods to detect an attack by Adversarial Example. Thus, the attack detection control information 1003 includes, as parameters, attack detection modes that indicate which method is used among a plurality of detection methods and threshold signals used in respective attack detection modes. It is obvious that threshold signals may be set for only threshold necessary in an attack detection mode. In this example, attack detection modes 1 to 4 are provided, and each method will be explained below.

FIG. 12 shows an attack detection flow in attack detection mode 1. In attack detection mode 1, a judgment is made based on the difference between the inference made by the conventional method and the inference according to example 1 (inference based on the distribution in a latent space). Both the determination unit 304 and the distance base determination unit 502 individually infer the label of the input data (S31). Both labels are compared, (S32), and if they do not match, a notification of an attack alert 1004 is sent to the user (S33).

Figure 13:
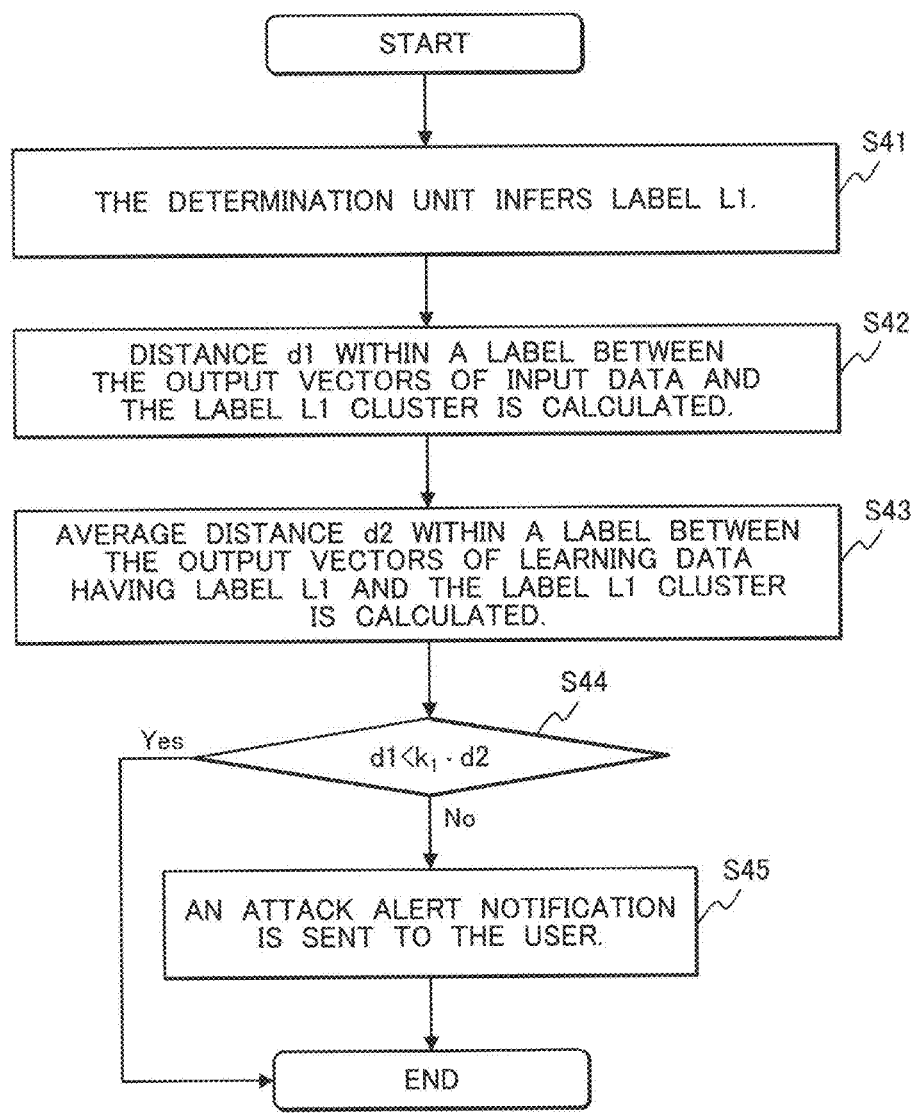
FIG. 13 shows an attack detection flow in attack detection mode 2.

FIG. 13 shows an attack detection flow in attack detection mode 2. In attack detection mode 2, a judgment is made based on whether the inference made by the conventional method is normal or not as a distribution in a latent space. Concerning input data, the determination unit 304 infers label L1 of the input data (S41). Concerning output vector of the predetermined hidden layer corresponding to input data obtained by applying a learned neural network model to the input data, distance d1 within a label to the output vector cluster of label L1 is calculated (S42). Distance d1 within a label is defined as a distance between the position of output vector corresponding to input data and the barycentric position of the output vector cluster of label L1 in a latent space. Furthermore, concerning output vectors corresponding to learning data of label L1, average distance d2 within a label to the output vector cluster of label L1 is calculated (S43). Average distance d2 within a label is obtained such that distances between the positions of respective output vectors corresponding to respective pieces of learning data and the barycentric position of the output vector cluster of label L1 in a latent space are obtained and then averaged. Based on the distance d1 within a label and average distance d2 within a label, when input data is inferred as label L1, it is judged whether the positional relationship with the output vector cluster of label L1 is normal or not (S44). In this example, if distance d1 within a label is less than $k_1$ times the average distance d2 within a label, it is judged normal; and if the distance is equal to or more than $k_1$ times, it is judged abnormal and a notification of an attack alert 1004 is sent to the user (S45). Herein, an abnormality judgment method shown in FIG. 13 is an example. Although an average value is regarded as a representative value in the example shown in FIG. 13, a maximum value can be used instead of the average distance d2 within a label, and it is possible to define a judgment formula accordingly.

Figure 14:
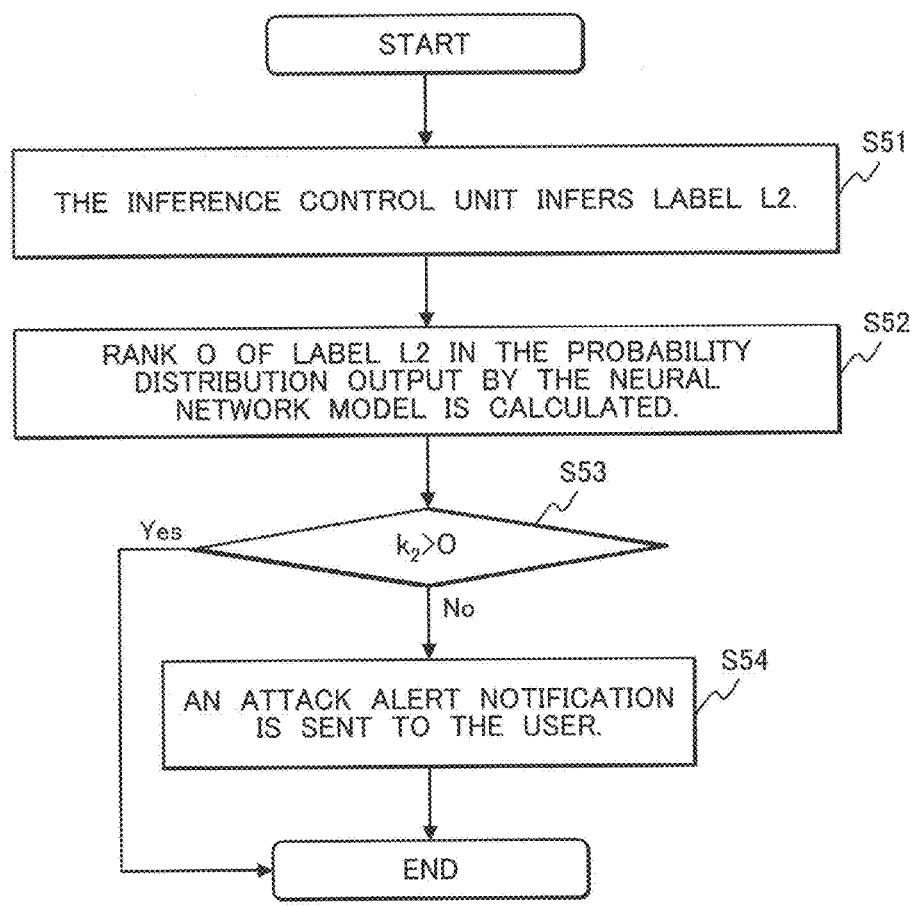
FIG. 14 shows an attack detection flow in attack detection mode 3.

FIG. 14 shows an attack detection flow in attack detection mode 3. In attack detection mode 3, a judgment is made based on whether or not the inference based on the distribution in a latent space matches the probability distribution of respective labels finally output by the neural network model. The distance base determination unit 502 infers label L2 of input data (S51). Then, rank O of label L2 in the probability distribution (see FIG. 3) of respective labels finally output by the neural network model is calculated (S52). Whether rank O of label L2 in the probability distribution is unnaturally low or not is judged (S53). In this example, if rank O is higher than $k_2$, it is judged normal; and if rank O is equal to or lower than $k_2$, it is judged abnormal and a notification of an attack alert 1004 is sent to the user (S54).

Figure 15:
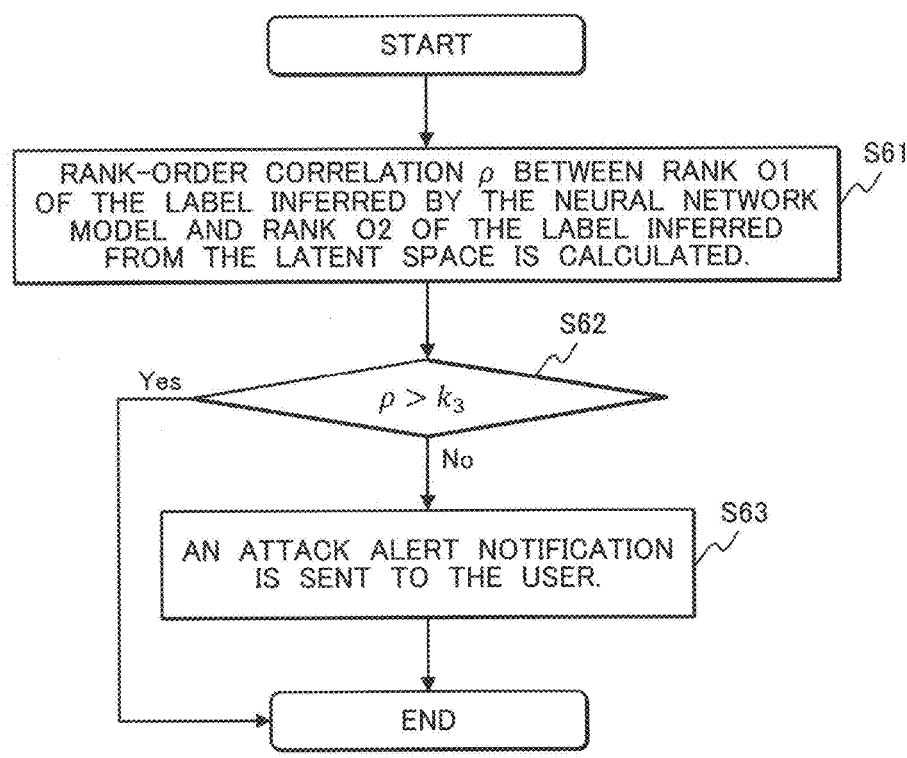
FIG. 15 shows an attack detection flow in attack detection mode 4.

FIG. 15 shows an attack detection flow in attack detection mode 4. In attack detection mode 4, a judgment is made based on whether or not the inference made by the neural network model matches the inference based on a latent space. First, rank O1 of respective labels in the probability distribution, which is obtained by applying a learned neural network model to input data, is obtained. For example, rank O1 can be obtained from the values in the graph 307 shown in FIG. 3. On the other hand, certainty rank O2 of respective labels is obtained based on the positional relationship between output vectors of the predetermined hidden layer corresponding to input data and the output vector cluster of respective labels. For example, rank O2 can be obtained from the distances between the position of output vector corresponding to input data and the output vector clusters of respective labels in a latent space 510 shown in FIG. 5A. Then, rank-order correlation ρ between rank O1 and rank O2 is calculated (S61). The degree of similarity between rank O1 and rank O2 is judged (S62). In this example, if rank-order correlation ρ is greater than $k_3$, it is judged normal; and if the rank-order correlation ρ is equal to or less than $k_3$, it is judged abnormal and a notification of an attack alert 1004 is sent to the user (S63).

Figure 16:
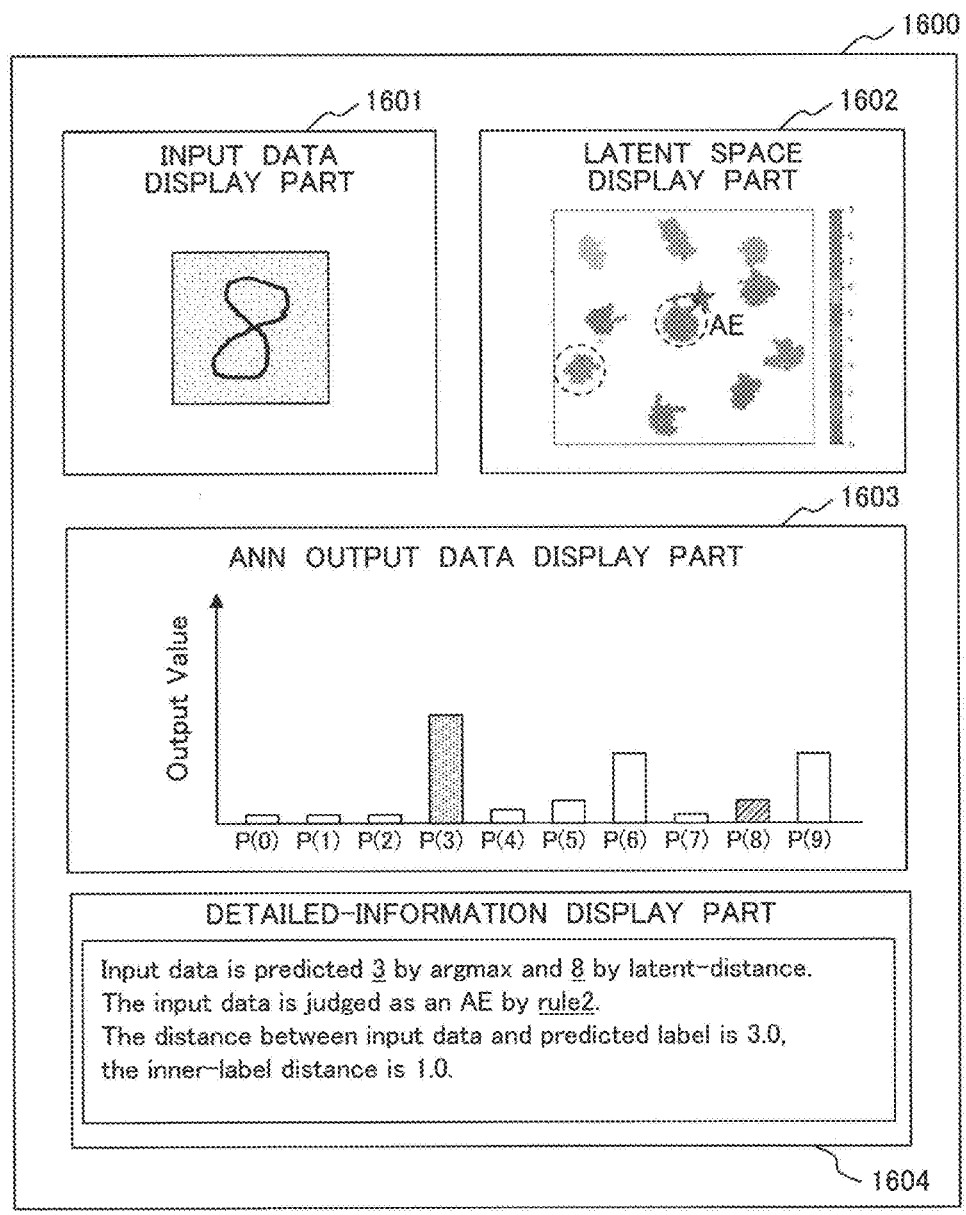
FIG. 16 shows an example of the display screen.

FIG. 16 shows an example of the display screen 1600 that appears on the display unit 211 when an attack by Adversarial Example is detected. The display screen 1600 has an input data display part 1601, a latent space display part 1602, a neural network model output data display part 1603, and a detailed-information display part 1604. The input data display part 1601 displays input data (image). The latent space display part 1602 displays the distribution of output vectors corresponding to input data and learning data in a latent space so that the inference control unit can use the distribution to infer the label. The neural network model output data display part 1603 displays the probability distribution of respective labels output from the neural network model. The detailed-information display part 1604 displays detailed information about an attack alert to provide the user with the contents of the attack alert and the reason for creating the attack alert notification to the user. According to the reason, it is desirable that related locations in latent space displayed in the latent space display part 1602 and the corresponding probability distribution displayed in the neural network model output data display part 1603 should be highlighted to allow the user to easily see the information. In the same manner as example 1, the inference unit 1001 in example 2 makes an inference based on the positional relationship in a latent space. However, it is possible to provide an attack detection unit shown in example 2 for the inference unit that makes an inference using a neural network model of the conventional method.

As stated above, explanation was given about robust neural network systems against an attack by Adversarial Example by using two examples. In those examples, a neural network model that executes learning using learning data was explained. However, the present invention is not limited to such a neural network model. For example, the present invention is also applicable to a neural network model that executes reinforcement learning.

Figure 17:
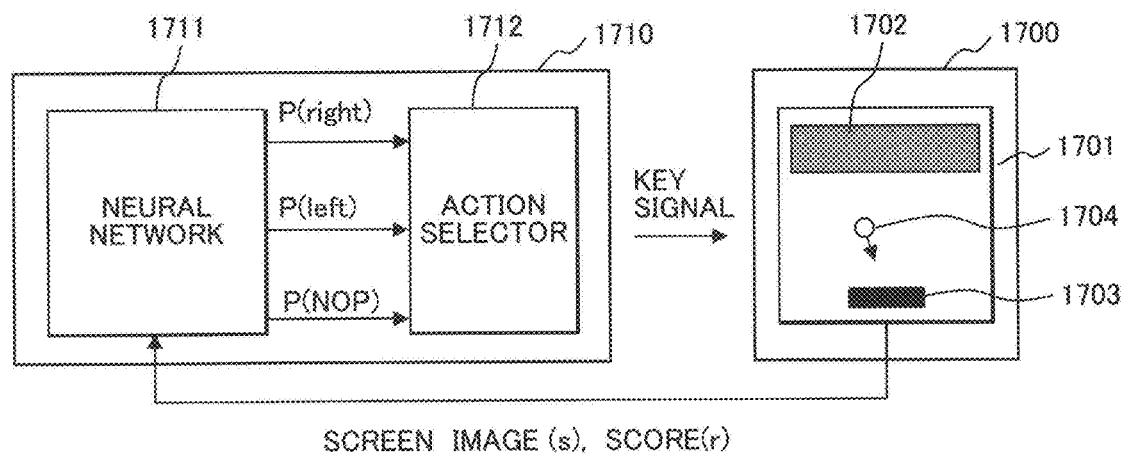
FIG. 17 shows an example of the system performing reinforcement learning.

FIG. 17 shows an example of a system that executes reinforcement learning. A game machine 1700 is operated by a player 1710 using a neural network. In the game displayed on the game screen 1701, a ball 1704 is shuttle-cocked between the block 1702 and the paddle 1703 by moving the paddle 1703 from side to side. When the ball 1704 hits a block, the block disappears, and score r is added. However, if the paddle 1703 fails to hit the ball 1704, the game will end. The player 1710 has a neural network model 1711, and screen images are input into the neural network model 1711, and based on the screen images, selection probabilities of moving the paddle 1703 (right direction, left direction, still) are output. Based on the output from the neural network model 1711, the selector 1712 selects a paddle operation. Regarding score r as a reward, the neural network model 1711 executes learning so as to obtain higher score r.

Figure 18:
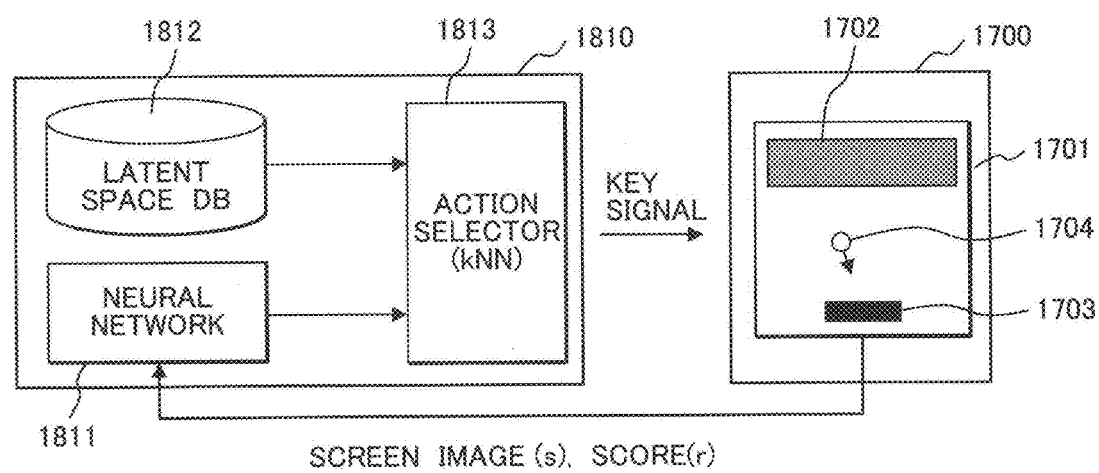
FIG. 18 shows an example of the system performing reinforcement learning.

FIG. 18 shows a player to which the neural network system according to this example is applied. Because reinforcement learning is executed online, along with learning of the neural network model 1811, positions of output vectors in a predetermined latent space are stored online in the latent space database 1812. The selector 1813 selects a paddle operation based on the distribution of output vectors in the latent space. In the neural network system shown in FIG. 18, learning is executed by the neural network system shown in FIG. 17, and inference is made by the neural network system using a latent space database 1812 shown in FIG. 18.

REFERENCE SIGNS LIST

101: apparatus, 102: ground object, 103, 104: sensor, 105: network, 106: sensor data, 107: status data, 110: gateway, 111: computer, 115: attacker, 201: processor, 202: GPU, 203: memory, 204: auxiliary storage unit, 205: network interface, 206: input/output interface, 210: input unit, 211: display unit, 301: image, 302: neural network model, 303: probability, 304: determination unit, 306: hidden layer, 307: graph, 310: noise image, 311: attack image, 501: mapping unit, 502: distance base determination unit, 510: latent space, 511: cluster, 601: learning unit, 602: learning control unit, 603: neural network model, 604: learning data storage control unit, 605, 1001: inference unit, 606: inference control unit, 607: database external interface, 608: learned model database, 609: latent space database, 610: neural network configuration information, 611: learning control information, 612: learning data, 613: learning data storage control information, 614: inference control information, 615: input data, 616: output data, 617: database update information, 1002: attack detection unit, 1003: attack detection control information, 1004: attack alert, 1600: display screen, 1601: input data display part, 1602: latent space display part, 1603: neural network model output data display part, 1604: detailed-information display part, 1700: game machine, 1701: game screen, 1702: block, 1703: paddle, 1704: ball 1704, 1710, 1810: player, 1711, 1811: neural network model, 1712, 1813: selector, 1812: latent space database.

What is claimed is:

1. An information processing system that improves an ability of a neural network to withstand and detect latent attacks, comprising:
a communication interface that is communicatively coupled to the neural network, wherein the neural network includes a plurality of hidden layers;
a latent space database for storing position information in a latent space in which first output vectors, which are output vectors of a predetermined hidden layer included in the neural network, are embedded with input data used for learning of the neural network;
a processor that is communicatively coupled to the latent space database and the communication interface, wherein the processor is configured to:
infer the input data to generate an inference based on a positional relationship between a second output vector, which is an output vector of a predetermined hidden layer concerning input data to be inferred, and the first output vectors in the latent space,
detect an attack by Adversarial Example via at least one of a plurality of attack detection modes which compare the inference made by the neural network with the inference based on the positional relationship between the second output vector and the first output vectors in the latent space; and
display an attack alert notification when the attack by an Adversarial Example is detected.

2. The information processing system according to claim 1,
wherein the latent space database stores a low-dimensional model for converting the first output vectors into lower dimensional data and the lower dimensional first output vectors converted by the low-dimensional model; and
the processor infers the input data based on the positional relationship between the lower dimensional second output vector converted by the low-dimensional model and the converted lower dimensional first output vectors in the latent space.

3. The information processing system according to claim 1, wherein the processor is further configured to
execute learning of the neural network by using learning data, which is a combination of input data for learning input into the neural network and training data indicating which label among a plurality of labels is applicable to the input data for learning; and
infer the input data based on a distance between the second output vector and a cluster of the first output vectors of each of the plurality of labels in the latent space.

4. The information processing system according to claim 1, wherein the processor is further configured to:
execute online learning so as to maximize reward by selecting any one of a plurality of options with respect to the input data input into the neural network; and
infer the input data based on the positional relationship between the second output vector and a cluster of the first output vectors of each option in the latent space.

5. The information processing system according to claim 1, further comprising a database external interface;
wherein the neural network and the latent space database can be externally updated or data can be added via the database external interface.

6. An inference method that improves an ability of a neural network to withstand and detect latent attacks, the method comprising:
storing position information in a latent space database, wherein the position information is in a latent space in which first output vectors are output vectors of a hidden layer of the neural network that are embedded with input data used for learning of the neural network, comprising:
obtaining a second output vector which is an output vector of the hidden layer included in the neural network with input data to be inferred;
inferring the input data based on a positional relationship between the second output vector and the first output vectors in the latent space;
detecting an attack by an Adversarial Example via at least one of a plurality of attack detection modes which compare the inference made by the neural network with the inference based on the positional relationship between the second output vector and the first output vectors in the latent space; and
displaying an attack alert notification when the attack by Adversarial Example is detected.

7. The inference method according to claim 6, wherein the latent space database stores a low-dimensional model for converting the first output vectors into lower dimensional data and the lower dimensional first output vectors converted by the low-dimensional model, comprising:
inferring the input data based on a positional relationship between the lower dimensional second output vector converted by the low-dimensional model and the converted lower dimensional first output vectors in the latent space.

8. The inference method according to claim 6, wherein the latent space database stores the first output vectors, comprising:
acquiring a low-dimensional model for converting the first output vectors and the second output vector into lower dimensional data; and
inferring the input data based on a positional relationship between a lower dimensional second output vector converted by the low-dimensional model and the lower dimensional first output vectors converted by the low-dimensional model in the latent space.

9. An attack detection method for improving an ability of a neural network to withstand and detect latent attacks, the method comprising:
determining which label among a plurality of labels is applicable to input data or select any one of a plurality of options to maximize reward for input data;

storing position information in a latent space database, wherein the position information is in a latent space in which first output vectors of a hidden layer included in the neural network are embedded with input data used for learning of the neural network;

obtaining a second output vector which is an output vector of the hidden layer included in the neural network with input data to be inferred;

detecting an attack by an Adversarial Example via at least one of a plurality of attack detection modes which compare a first inference made by the neural network and a second inference based on a positional relationship between the second output vector and the first output vectors in the latent space; and displaying an attack alert notification when the attack by Adversarial Example is detected.

10. The attack detection method according to claim 9, comprising:

obtaining a first inference result based on a probability calculated by the neural network concerning the plurality of labels or the plurality of options;

obtaining a second inference result based on the positional relationship between the second output vector and the first output vectors in the latent space; and detecting an occurrence of the attack by the Adversarial Example when the first inference result does not match the second inference result.

11. The attack detection method according to claim 9, comprising:

obtaining a first inference result based on a probability calculated by the neural network concerning the plurality of labels or the plurality of options;

calculating a first distance which is a distance between the second output vector and a barycentric position of a cluster of the first output vectors of a portion of the input data, wherein the input data, used for learning of the neural network, having the same label as the first inference result or the same option as selected in the first inference result are used as the portion of the input data;

calculating a second distance which is a distance between the respective first output vector of the portion of the input data and the barycentric position of the cluster of the first output vectors of the portion of the input data; and determining an occurrence or non-occurrence of the attack by the Adversarial Example based on the first distance and a representative value of the second distance.

12. The attack detection method according to claim 9, comprising:

obtaining a second inference result based on the positional relationship between the second output vector and the first output vectors in the latent space; and determining an occurrence or non-occurrence of the attack by the Adversarial Example based on a rank of the second inference result in a probability distribution calculated by the neural network concerning the plurality of labels or the plurality of options.

13. The attack detection method according to claim 9, comprising:

performing a first ranking concerning the plurality of labels or the plurality of options based on a probability distribution calculated by the neural network concerning the plurality of labels or the plurality of options;

performing a second ranking concerning the plurality of labels or the plurality of options based on the positional relationship between the second output vector and the first output vectors in the latent space; and determining an occurrence or non-occurrence of the attack by the Adversarial Example based on a rank-order correlation between the first ranking and the second ranking.

14. A non-transitory computer readable storage medium that stores an inference execution program that improves an ability of a neural network to withstand and detect latent attacks and that when executed by a processor causes the processor to execute a method comprising:

storing position information in a latent space database, wherein the position information is in a latent space in which first output vectors are output vectors of a hidden layer of the neural network that embeds input data used for learning of the neural network obtaining a second output vector which is an output vector of the hidden layer included in the neural network concerning input data to be inferred, and inferring the input data based on a positional relationship between the second output vector and the first output vectors in the latent space;

detecting an attack by an Adversarial Example via at least one of a plurality of attack detection modes which compare the inference made by the neural network with the inference based on the positional relationship between the second output vector and the first output vectors in the latent space; and displaying an attack alert notification when the attack by Adversarial Example is detected.

15. A non-transitory computer readable storage medium that stores an attack detection program for improving an ability of a neural network to withstand and detect latent attacks, the attack detection program when executed by a processor cause the processor to execute a method comprising:

determining which label among a plurality of labels is applicable to input data or select any one of a plurality of options to maximize reward for input data by using the neural network, wherein the neural network includes a plurality of hidden layers;

storing position information in a latent space database, wherein the position information is in a latent space in which first output vectors that are output vectors of a predetermined hidden layer included in the neural network and, are embedded with input data used for learning of the neural network;

obtaining a second output vector which is an output vector of the predetermined hidden layer included in the neural network concerning input data to be inferred, detecting an attack by an Adversarial Example via at least one of a plurality of attack detection modes which compare a first inference made by the neural network with a second inference based on a positional relationship between the second output vector and the first output vectors in the latent space, and displaying an attack alert notification when the attack by Adversarial Example is detected.

* * * * *